(12) United States Patent
Alonzo et al.

(10) Patent No.: US 9,002,162 B2
(45) Date of Patent: Apr. 7, 2015

(54) LARGE CORE MULTIMODE OPTICAL FIBERS

(71) Applicant: OFS Fitel, LLC, Norcross, GA (US)

(72) Inventors: John C Alonzo, Somerset, NJ (US); David D Braganza, Southbridge, MA (US); Merrill H Brodeur, Ware, MA (US); James W Fleming, Westfield, NJ (US)

(73) Assignee: OFS Fitel, LLC, Norcross, GA (US)

( * ) Notice: Subject to any disclaimer, the term of this patent is extended or adjusted under 35 U.S.C. 154(b) by 209 days.

(21) Appl. No.: 13/834,973

(22) Filed: Mar. 15, 2013

(65) Prior Publication Data

US 2014/0270665 A1    Sep. 18, 2014

(51) Int. Cl.
*G02B 6/32* (2006.01)
*C03B 37/018* (2006.01)
*C03B 37/012* (2006.01)

(52) U.S. Cl.
CPC ......... *C03B 37/0183* (2013.01); *C03B 2201/12* (2013.01); *C03B 2203/22* (2013.01); *C03B 2203/24* (2013.01); *C03B 2203/26* (2013.01); *C03B 2207/70* (2013.01); *C03B 37/01262* (2013.01)

(58) Field of Classification Search
USPC ........................................... 385/34
See application file for complete search history.

(56) References Cited

U.S. PATENT DOCUMENTS

| | | | |
|---|---|---|---|
| 6,173,588 B1 * | 1/2001 | Berkey et al. | 65/407 |
| 6,372,305 B2 | 4/2002 | Breuls et al. | |
| 7,759,874 B2 | 7/2010 | Hartsuiker et al. | |
| 8,252,387 B2 | 8/2012 | Fleming et al. | |
| 2003/0104139 A1 | 6/2003 | House et al. | |
| 2003/0115909 A1 | 6/2003 | House et al. | |
| 2004/0159124 A1 | 8/2004 | Atkins et al. | |
| 2011/0067451 A1 * | 3/2011 | Fleming et al. | 65/390 |

* cited by examiner

Primary Examiner — Uyen Chau N Le
Assistant Examiner — Hoang Tran

(57) ABSTRACT

The specification describes multimode optical fibers produced by improved methods that reduce the manufacturing cost. These methods may also be more efficient in terms of power loss. In one of the embodiments, the improved design has a large core of pure silica derived from a rod-in-tube method. In the embodiment, a down-doped cladding is produced by depositing fluorine-doped silica on the inside of a silica starting tube using isothermal radio frequency plasma deposition. The silica core is inserted and the starting tube collapsed. The silica starting tube is removed and optical fiber is drawn from the fluorine-doped glass coated silica rod.

31 Claims, 3 Drawing Sheets

US 9,002,162 B2

LARGE CORE MULTIMODE OPTICAL FIBERS

FIELD OF THE INVENTION

This invention relates to a family of designs for optical fibers with large cores. More specifically it relates to multimode optical fibers designed for cost effective manufacture.

BACKGROUND OF THE INVENTION

Optical fibers with very low loss are used for medium and long haul transmission of optical signals. They typically transmit a single mode in a small core. To provide optimum light guiding properties for low loss the refractive index profile of the optical fibers is often complex, usually with an up-doped (with respect to pure silica) core, and multiple cladding layers. In contrast, many optical fibers for short haul applications, e.g., meters to tens of meters, are multimode fibers with simpler designs and attendant lower cost. These optical fibers typically have larger cores and carry higher optical power, but do not require optimum optical transmission efficiency. A main goal of these designs is ease of manufacture leading to lower unit cost.

One of these simple multimode designs has a step index with a pure silica core and a single down-doped cladding. This design contrasts with most single mode optical fiber designs that have a graded up-doped core and multiple layers of cladding. Thus this optical fiber is significantly less expensive to manufacture.

Although this step index multimode optical fiber is inherently simple and cost effective to manufacture, further cost reduction is a continual goal.

STATEMENT OF THE INVENTION

We have designed multimode optical fibers that may be produced by improved methods that reduce the manufacturing cost. These methods may also be more efficient in terms of power loss. In one of the embodiments, the improved design has a large core of pure silica derived from a rod-in-tube method. In the embodiment, a down-doped cladding is produced by inside tube deposition of fluorine-doped silica, using isothermal radio frequency plasma deposition. For convenience, the method is referred to here as Isothermal RF Plasma Inside Deposition, or IRFPID. The silica core is inserted and the starting tube collapsed. The silica starting tube may be removed and optical fiber is drawn from the fluorine-doped glass coated silica rod.

DETAILED DESCRIPTION

Figure 1:
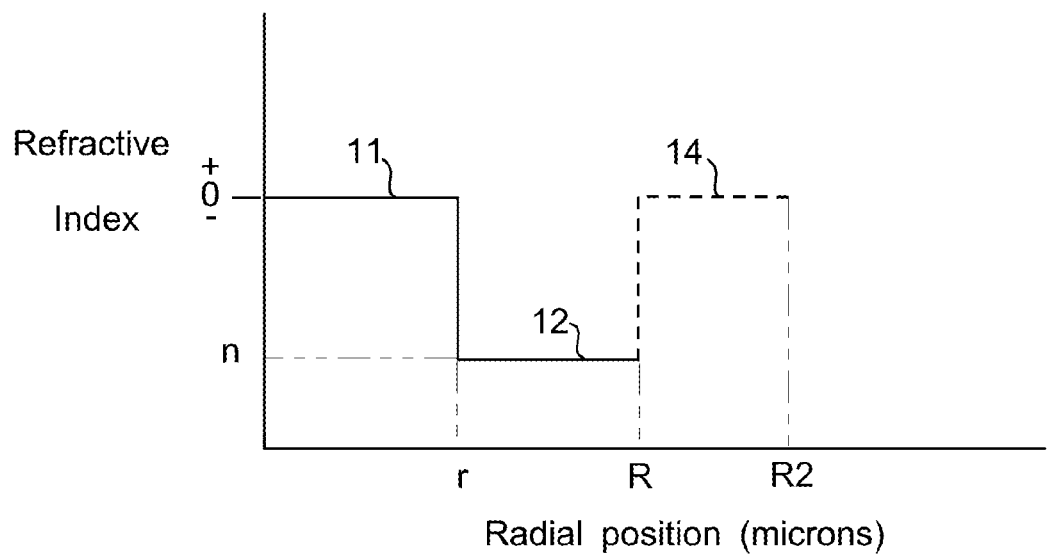
FIG. 1 is a diagram of an optical fiber refractive index profile as an embodiment of the invention showing general profile parameters to aid in describing the inventive IRFPID method.

With reference to FIG. 1, exemplary dimensional design parameters that can be created by the inventive IRFPID method is shown. The figure shows a step refractive index profile for a multimode optical fiber, where optical fiber core 11 is pure silica, or lightly doped silica, shown with a delta of approximately zero. Delta is the commonly used percent difference between refractive index and a base value of zero, representing the refractive index of pure silica. The core size is 2r. The overall optical fiber core/clad radius in this embodiment is represented by R. The cladding 12 is fluorine-doped silica, and has a negative delta as shown. Typical negative delta values, n, for the down-doped cladding may be lower than −0.05%, preferably in the range between −0.05% and −3.0%, and most preferably between −0.15% and −2.2%. The large core radius is represented by r, and typically varies from 5 microns to 1000 microns, preferably from 24 microns to 100 microns. The thickness R−r of the down-doped cladding may vary from 0.5 micron to 1000 microns, and preferably from 1 micron to 200 microns.

In a second embodiment, represented by dashed line 14, the overall optical fiber core/clad radius is R2. Region 14 is an undoped cladding layer with a thickness R2−R. Steps for producing this cladding layer are set forth below. The radius R2 may vary widely.

As is well known in the art, the same proportionate profile, with different absolute values, will characterize the preforms used to manufacture the IRFPID optical fibers.

Figure 2:
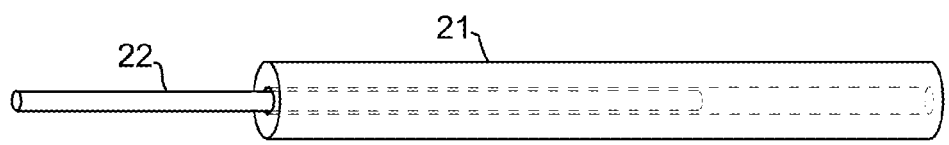
FIGS. 2 and 3 are schematic representations of the rod-in-tube process for the IRFPID method for manufacture of optical fiber preforms.

IRFPID optical fiber preforms are made, according to the invention, by a modified rod-in-tube method. The rod-in-tube method is described in conjunction with FIGS. 2 and 3. It should be understood that the figures referred to are not necessarily drawn to scale.

The core rod 22 is shown being inserted into the cladding tube 21. According to the preferred embodiment of the invention the core rod is pure silica, or lightly-doped silica, having an index delta of approximately zero. Preferably, for optimum low loss, the core rod is undoped. Pure silica rods are available commercially from a variety of sources. The manufacture of the core rod is not part of the IRFPID method described here. This bifurcation of the core rod production from the main IRFPID method adds flexibility and cost effectiveness to the production sequence. Although a pure silica rod is a preferred core rod, any glass core rods suitable for a multimode optical fiber core can be used. For example, variety types of graded index glass core rods can be used as a glass core for the preform made by the inventive IRFPID method.

It will also be recognized by those skilled in the art that using very large prefabricated core rods allows correspondingly large core diameters to be produced without adding time and complexity to preform fabrication, and allows a substantial increase in preform size relative to prior art methods where the core material is deposited as soot.

Figure 3:
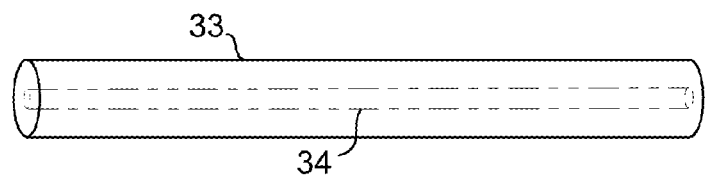

After assembly of the rod 22 and tube 21, the tube is collapsed onto the rod to produce a solid rod 33, shown in FIG. 3, with the core rod 34 indistinguishable from the cladding tube except for a small refractive index difference.

The tube in the IRFPID method is produced by depositing down-doped glass inside a glass tube substrate. A glass tube substrate representative of dimensions actually used commercially has a typical length to diameter ratio of 10-15. The inside tube deposition provides a protected environment so the purity and composition of the deposition environment can be highly controlled. The deposition method uses an isothermal RF generated plasma to create a narrow reaction zone in the tube. Isothermal low pressure plasma operating conditions are used that generate a narrow deposition zone upstream of the plasma (i.e., a location between the introduction of the reactant materials and the plasma). The plasma operating conditions typically depend on a number of interacting parameters. In essence, the key objective is to provide sufficient energy density for the creation of a narrow reaction zone, while maintaining a heat level low enough to avoid vaporizing the inner surface of the substrate tube.

Figure 4:
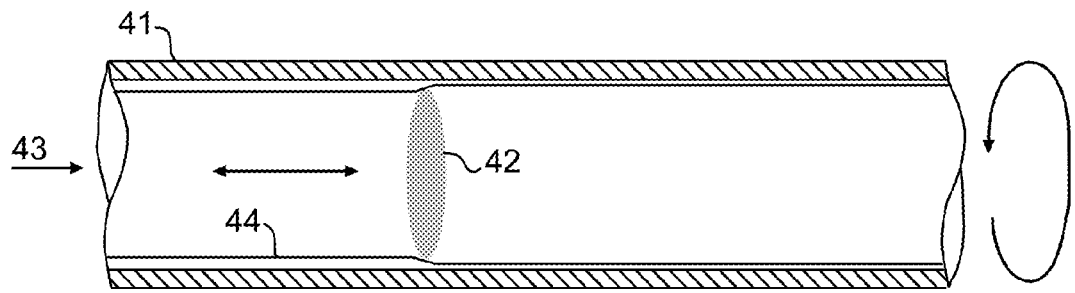
FIG. 4 is a schematic representation of an IRFPID process showing deposition of high purity glass on the interior walls of the IRFPID starting tube.

The IRFPID method will be described in detail with the aid of the schematic illustration in FIG. 4. In IRFPID, several operating parameters are controlled to allow for the formation of an extremely narrow deposition zone immediately upstream of the created plasma. The deposition conditions may be controlled such that the narrow deposition zone occupies about only 1% of the length of a conventional substrate tube. This contrasts with the 10-30% values associated with prior art MCVD and PCVD processes. More broadly, the conditions utilized typically result in a narrow deposition zone of one centimeter or less. A silica tube 41 is used as the substrate tube. Glass precursors are introduced into tube 41 at 43. In this embodiment, the reactants comprise silicon and fluorine compounds suitable for creating a fluorine-doped glass 44 on the inside wall of the substrate tube. These may include $SiCl_4$ and $C_2F_6$. However, other precursor materials, well known in the art for producing down-doped glass, may be used as well to create down-doped depositions inside the substrate tube.

A plasma generator is used to create an isothermal RF plasma 42 of sufficient energy density to form the fluorine-doped glass deposit. An "isothermal" plasma means that both the ions and electrons in the plasma are at approximately the same temperature. In contrast, conventional PCVD systems use a non-isothermal plasma, where the electrons have a much higher energy that the ions. The use of an isothermal plasma in the arrangement of the present invention allows for the reaction and deposition to occur immediately "upstream" of the plasma, as shown in FIG. 4. The upstream deposition mechanism results in the creation of molten glass particles, as opposed to soot, through homogeneous particle formation and growth. These molten glass particles are then thermophoretically deposited upstream of the plasma. The deposition occurs prior to the reactants entering the plasma region. A narrow heat zone, within a few inches of the center of the plasma, provides a high concentration of heat for reaction and thermophoretic deposition, while the plasma further downstream heats the tube wall, thereby increasing the temperature on the side wall of substrate tube 41. Thus, as the plasma generator traverses tube 41, the heated zone "upstream" of the plasma is the area where deposition occurs. The temperature of the inside wall is sufficient to melt the glass particles and form a uniform glass film. The parameters of the IRFPID process are controlled such that the reaction zone is not heated to a temperature at which the substrate will begin to vaporize or decompose instead of melt. For example, it is recommended that the RF plasma operate with a power range of 2-20 kW, and the temperature of the tube substrate maintained in the range 1000 C to 1600 C. The pressure in the IRFPID method is less than atmospheric pressure, for example, less than 100 Torr, and preferably in the range 0.1 to 50 Torr. The low pressure, in combination with the isothermal plasma, results in the deposition zone being extremely narrow, e.g., on the order of 1% of the tube length, typically about one centimeter or less. The low pressure also helps reduce the heat content of the very high temperature plasma so that the substrate and reactants are not vaporized. The IRFPID method also produces a higher deposition efficiency than other processes, leading to further cost savings.

An important characteristic of the IRFPID method is that the low pressure, isothermal plasma process creates molten glass particles that are deposited on the substrate wall prior to entering the plasma (i.e., "upstream" of the plasma). Soot is not created/deposited in the inventive process. Moreover, there is no evidence of additional deposition occurring in the plasma region; all deposition takes place in the narrow zone immediately upstream of the plasma. Also, the plasma is not used for a consolidation step since the deposited particles are glass particles that are consolidated as deposited.

More details of the isothermal plasma deposition step may be found in U.S. Pat. No. 8,252,387, issued Aug. 28, 2012, and assigned to the assignee of this application. This patent in its entirety is incorporated herein by reference.

It will be understood by those skilled in the art that in addition to the refractive index profile represented by FIG. 1, the IRFPID method may be implemented to produce a wide variety of refractive index profile variations now known, or to be developed, that require one or more down-doped regions. It will also be appreciated that the ability to form core material to an increased thickness, allows wide versatility in core design.

Figure 5:
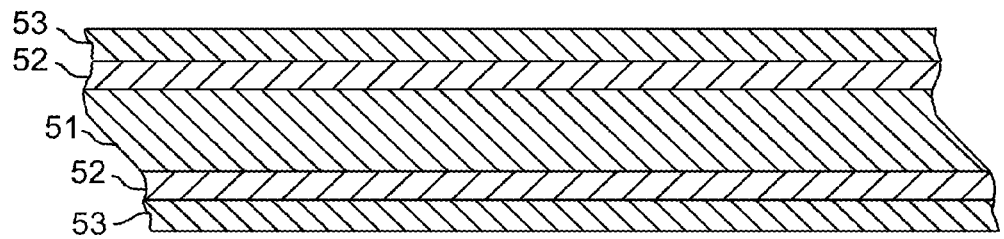
FIG. 5 represents the collapse step after the IRFPID process.

When the IRFPID deposition is complete the tube is collapsed onto the silica core rod using known techniques, i.e. heating the tube to above the glass softening temperature, i.e. >2000-2400 C. to allow the surface tension of the glass tube to slowly shrink the tube diameter, finally resulting, after multiple passes of the torch, in a solid rod. The collapsed rod is shown in FIG. 5, with the silica core rod shown at 51, the IRFPID silica starting tube at 53, and the IRFPID down-doped layer at 52. If desired, pre-collapse cleaning steps may be incorporated. Also, the ambient between the rod and the tube may be controlled. Details of suitable added steps are described in U.S. Pat. No. 8,252,387, issued Aug. 28, 2012, which is incorporated herein by reference for additional teachings related to the invention.

Next, in accordance with a preferred aspect of the invention, the IRFPID silica starting tube at 53 may be removed. This may be accomplished by mechanical grinding, by plasma etching, by chemical etching or by a combination of these techniques. In certain cases, depending on the application and/or quality of the starting tube material, a residual amount of starting tube material surrounding the IRFIPD deposited glass may be retained. However, in a preferred embodiment, all the starting tube glass is removed. The end point of the etching process can be determined from a refractive index profile of the collapsed rod. The etched preform may be measured after grinding or etching is complete to determine the amount of overetching, which is then factored into the selection of the starting tube. It will be evident that overetching is preferable to underetching in this case. Accordingly, the IRFPID deposition and the etch time may be designed for limited but finite etching of IRFPID deposited material. Preferably more than 90% of the tube is removed, and more typically, all of the tube is removed.

The embodiment where at least part of the starting tube is retained is illustrated in FIG. 1 by dashed lines 14.

Figure 6:
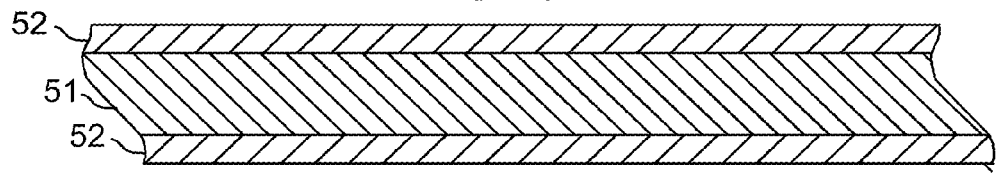
FIG. 6 represents the optional step in the inventive process of removing the IRFPID starting tube, leaving a step index preform for drawing optical fiber.

After removing at least part of the IRFPID starting tube, the IRFPID deposited glass core remains, as shown in FIG. 6. In the preferred practice of the invention, the rod in FIG. 6 is the IRFPID preform for the drawn optical fiber.

Figure 7:
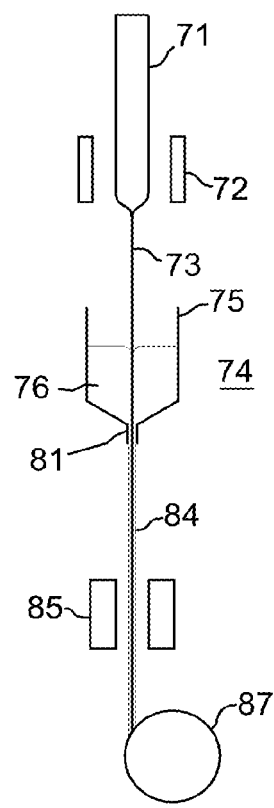
FIG. 7 is a schematic representation of a fiber drawing apparatus useful for drawing preforms made by the IRFPID method into continuous lengths of optical fiber.

The IRFPID optical fiber preform, as described above, is then used for drawing optical fiber. A suitable apparatus for drawing optical fiber from the IRFPID preform is illustrated in FIG. 7. FIG. 7 shows preform 71, and susceptor 72 representing a furnace (not shown) used to soften the glass preform and initiate fiber draw. The drawn fiber is shown at 73. The nascent fiber surface is then passed through a coating cup, indicated generally at 74, which has chamber 75 containing a coating prepolymer 76. The liquid coated fiber from the coating chamber exits through die 81. The combination of die 81 and the fluid dynamics of the prepolymer, controls the coating thickness. The prepolymer coated fiber 84 is then exposed to UV lamps 85 to cure the prepolymer and complete the coating process. Other curing radiation may be used where appropriate. The fiber, with the coating cured, is then taken up by take-up reel 87. The take-up reel controls the draw speed of the fiber. Draw speeds in the range typically of 1-50 m/sec. can be used. It is important that the fiber be centered within the coating cup, and particularly within the exit die 81, to maintain concentricity of the fiber and coating. A commercial apparatus typically has pulleys that control the alignment of the fiber. Hydrodynamic pressure in the die itself aids in centering the fiber. A stepper motor, controlled by a microstep indexer (not shown), controls the take-up reel.

Coating materials for optical fibers are typically urethanes, acrylates, or urethane-acrylates, with a UV photoinitiator added. The apparatus is FIG. 7 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150-300 microns in diameter, with approximately 240 microns standard.

Furthermore, the inventive IRFPID method can be used to manufacture a down-doped tube. Instead of inserting a core after the deposition of down dopant such as fluorine, the down-doped tube can be used as a standalone overcladding tube. Depend on the application of the down-doped tube, at least a portion of the starting tube may be removed by any of the methods described above. Although variety of starting tubes can be used for the inventive IRFPID method, a starting tube having the inner tube diameter of 20 mm or larger and the tube wall thickness of 3 mm or thicker is a preferred starting tube for manufacturing of a down-doped tube.

To achieve desired down-doping profile in the IRFPID method, deposition of silica and down-doping compounds must be carefully controlled. For example, for fluorine deposition using the inventive IRFPID method, it is recommended that the RF plasma operates with a power range of 2-20 kW, the tube inner wall temperature is maintained in the range of 1000 C to 1600 C, and the pressure inside the tube is maintained in the range of 0.1 to 50 Torr. Preferably, RF power is in the range of 3-15 kW, the tube inner wall temperature is in the range of 1100 C to 1400 C, and the pressure inside the tube is in the range of 5 to 20 Torr.

Flow rates of certain chemical compounds during the deposition also need to be controlled carefully. For example, for fluorine deposition using the inventive IRFPID method, it is recommended that $O_2$ is delivered in the range of 50 to 15,000 cc/min., $SiCl_4$ is delivered between 0 to 2000 cc/min., and $SiF_4$ or $C_2F_6$ is delivered in the range of 1 to 2000 cc/min. Preferably, $O_2$ is delivered in the range of 500 to 10,000 cc/min., $SiCl_4$ is delivered in the range of 0 to 1500 cc/min., and $SiF_4$ or $C_2F_6$ is delivered in the range of 10 to 1000 cc/min.

Preferably, traverse velocity of the created isothermal plasma is more than 1 m/min., most preferably, more than 4 m/min. And, Traverse length of the plasma is preferably more than 0.1 m, and most preferably between 0.25 and 3 m.

Although variety of starting tubes can be used for the inventive IRFPID method, a starting tube having the inner tube diameter of 20 mm or larger and the tube wall thickness of 3 mm or thicker is a preferred starting tube for the inventive IRFPID method.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:
1. Process for manufacture of optical fiber comprising:
   (a) heating an optical fiber preform to the softening temperature, and
   (b) drawing an optical fiber from the preform, the invention characterized in that the optical fiber preform is prepared by steps comprising:
      (i) forming by Isothermal RF Plasma Inside Deposition (IRFPID): a down-doped glass gladding layer on the inside of an IRFPID silica starting tube, wherein the IRFPID comprises:
         (i') placing the silica starting tube within a resonant coil of a plasma generator,
         (ii') introducing a down-dopant-containing chemical reactant into the silica starting tube,
         (iii') maintain the internal pressure within the silica start tube at less than atmospheric pressure,
         (iv') energizing the resonant coil to create an isothermal plasma within the silica starting tube,
         (v') heating the inner wall of the substrate tube,
         (vi') depositing down-doped glass on the silica starting tube within only a narrow zone upstream of the created isothermal plasma without deposition occurring within the isothermal plasma and the narrow zone being no greater than 1% of the length of the silica starting tube,
      (ii) inserting a glass core rod into the IRFPID silica starting tube,
      (iii) collapsing the IRFPID silica starting tube onto the glass core rod to produce a first solid glass body having a core material and down-doped cladding material on the core material wherein the negative delta values for the down doped glass cladding layer are lower than −0.05%.
2. The process of claim 1 further comprising a step of removing at least a portion of the IRFPID starting tube to form a second solid glass body of the core material, and the down-doped cladding material on the core material from the first solid glass body.
3. The process of claim 2 wherein only a portion of the IRFPID starting tube is removed.
4. The process of claim 2 wherein all of the IRFPID starting tube is removed.
5. The process of claim 2 wherein the IRFPID starting tube is removed by mechanical grinding.
6. The process of claim 2 wherein the IRFPID starting tube is removed by plasma etching.
7. The process of claim 2 wherein the IRFPID starting tube is removed by chemical etching.
8. The process of claim 2 wherein the IRFPID starting tube is removed by any combination of methods of mechanical grinding, plasma etching and chemical etching.

9. The process of claim 1 wherein the negative delta percentage values for the down-doped glass cladding layer are in the range of −0.15% and −2.2%.

10. The process of claim 1 wherein the glass core rod forms a core in the optical fiber with a radius from 5 microns to 1000 microns.

11. The process of claim 10 wherein the thickness of the down-doped cladding varies from 0.5 micron to 1000 microns.

12. The process of claim 1 wherein the glass core rod is a silica core rod having a delta value of approximately zero.

13. The process of claim 1 wherein the glass core rod is a graded index core rod.

14. The process of claim 1 wherein the down-dopant-containing chemical reactant contains fluorine.

15. Process for the manufacture of an optical fiber preform comprising:
   (i) forming by Isothermal RF Plasma Inside Deposition (IRFPID); a down-doped glass cladding layer on the inside of an IRFPID silica starting tube, wherein the IRFPID comprises:
      (i') placing the silica starting tube within a resonant coil of a plasma generator,
      (ii') introducing a down-dopant-containing chemical reactant into the silica starting tube,
      (iii') maintaining the internal pressure within the silica starting tube at less than atmospheric pressure,
      (iv') energizing the resonant coil to create an isothermal plasma within the silica starting tube,
      (v') heating the inner wall of the substrate tube,
      (vi') depositing down-doped glass on the silica starting tube within only a narrow zone upstream of the created isothermal plasma without deposition occurring within the isothermal plasma and the narrow zone being no greater than 1% of the length of the silica starting tube,
   (ii) inserting a glass core rod into the IRFPID silica starting tube,
   (iii) collapsing the IRFPID silica starting tube onto the glass core rod to produce a first solid glass body having a core material, and down-doped cladding material on the core material wherein negative delta values for the down-doped glass cladding layer are lower than −0.05%.

16. The process of claim 15 further comprising a step of removing at least a portion of the IRFPID starting tube to form a second solid glass body of the core material, and the down-doped cladding material on the core material from the first solid glass body.

17. The process of claim 15 wherein the down-dopant-containing chemical reactant contains fluorine.

18. An optical fiber having a core and a down-doped cladding wherein the core has a radius of 5 to 1000 microns and wherein the optical fiber is produced by the method of claim 1.

19. An optical fiber preform produced by the method of claim 15.

20. Process for the manufacture of a down-doped tube comprising:
   (i) forming by Isothermal RF Plasma Inside Deposition (IRFPID); a down-doped glass cladding layer on the inside of an IRFPID silica starting tube, wherein the IRFPID comprises:
      (i') placing the silica starting tube within a resonant coil of a plasma generator,
      (ii') introducing a down-dopant-containing chemical reactant into the silica starting tube,
      (iii') maintaining the internal pressure within the silica starting tube at less than atmospheric pressure,
      (iv') energizing the resonant coil to create an isothermal plasma within the silica starting tube,
      (v') heating the inner wall of the substrate tube,
      (vi') depositing down-doped glass on the silica starting tube within only a narrow zone upstream of the created isothermal plasma without deposition occurring within the isothermal plasma and the narrow zone being no greater than 1% of the length of the silica starting tube, wherein negative delta values for the down-doped glass cladding layer are lower than −0.05%.

21. The process of claim 20 further comprising a step of removing at least a portion of the IRFPID starting tube.

22. The process of claim 20 wherein the down-dopant-containing chemical reactant contains fluorine.

23. A down-doped tube produced by the method of claim 20.

24. A method of Isothermal RF Plasma Inside Deposition (IRFPID) comprising:
   (i') placing a silica starting tube within a resonant coil of a plasma generator having a power range of 2-20 kW,
   (ii') introducing a fluorine-dopant-containing chemical reactant into the silica starting tube,
   (iii') maintaining the internal pressure within the silica starting tube at the range 0.1 to 50 Torr,
   (iv') energizing the resonant coil to create an isothermal plasma within the silica starting tube,
   (v') heating the inner wall of the substrate tube to the range of 1000 C to 1600 C,
   (vi') depositing fluorine-doped glass on the silica starting tube within only a narrow zone upstream of the created isothermal plasma without deposition occurring within the isothermal plasma and the narrow zone being no greater than 1% of the length of the silica starting tube, wherein
      the fluorine-dopant-containing chemical reactant is delivered to the inside of the silica starting tube in the range of 1 to 2000 cc/min,
      $O_2$ is delivered in the range of 50 to 15,000 cc/min.,
      $SiCl_4$ is delivered in the range of 0 to 2000 cc/min.;
      traverse velocity of the isothermal plasma is more than 1 m/min.; and
      traverse length of the isothermal plasma is more than 0.1 m.

25. The process of claim 24 wherein
   the resonant coil of the plasma generator has a power range of 3-15 kW;
   the internal pressure within the silica starting tube is in the range of 5 to 20 Torr;
   the temperature within the silica starting tube is in the range of 1100 C to 1400 C;
   the fluorine-dopant-containing chemical reactant is delivered to the inside of the silica starting tube in the range of 10 to 1000 cc/min,
   $O_2$ is delivered in the range of 500 to 10,000 cc/min.,
   $SiCl_4$ is delivered between 0 to 1500 cc/min;
   traverse velocity of the isothermal plasma is more than 4 m/min.; and
   traverse length of the isothermal plasma is between 0.25 and 3 m.

26. The process of claim 24 wherein the starting tube has the inner tube diameter of 20 mm or larger and the tube wall thickness of 3 mm or thicker.

27. The process of claim 24 wherein the fluorine-dopant-containing chemical reactant includes $SiF_4$.

28. The process of claim 24 wherein the fluorine-dopant-containing chemical reactant includes $C_2F_6$.

29. An optical fiber having a core and a fluorine-doped cladding wherein the core has a radius of 5 to 1000 microns and wherein the optical fiber is produced by the method of claim 24.

30. An optical fiber preform produced by the method of claim 24.

31. A fluorine-doped tube produced by the method of claim 24.

* * * * *